United States Patent Office

3,249,615
Patented May 3, 1966

3,249,615
THERMOSETTING COMPATIBLE PETROLEUM WAX-UNSATURATED POLYESTER RESIN COMPOSITION
Guenter R. Ackermann, Broomall, Pa., assignor to The Atlantic Refining Company, Philadelphia, Pa., a corporation of Pennsylvania
No Drawing. Filed Mar. 12, 1963, Ser. No. 264,695
7 Claims. (Cl. 260—28.5)

This application is a continuation-in-part of my copending application, Serial No. 139,857, filed September 22, 1961, entitled "Wax Compositions," now abandoned.

This invention relates to novel wax compositions, and more particularly, to wax compositions having incorporated therein certain specific polyester-type resinous polymers.

Polyester resins are well known in the prior art. (See Polyester Resins, John R. Lawrence, Reinhold Publishing Corporation, 1960.) They are prepared by the reaction of a polybasic acid and a polyhydric alcohol to form a series of ester linkages. Depending on the types of acids and alcohols used and other modifications of the polyester structure, many different types of polyester resins may be formulated such as unsaturated polyesters, alkyds, plasticizers, fibers and film, and polyester foams. The unsaturated polyesters are conventionally linear polyester resins based on dibasic acids and dihydroxy alcohols which resins are capable of being crosslinked with vinyl monomers to form thermoset polymeric materials which have particular utility as reinforcing laminates, and in other molding, casting, and coating applications.

Wax and wax compositions have long been used in the coating art, particularly for the purpose of rendering materials waterproof. Wax and wax compositions have been used also as laminants. However, most of these compositions do not impart rigidity to the coated or laminated article and at elevated temperatures they tend to creep, causing buckling and sagging. These disadvantages are inherent in wax and most wax compositions since they are thermoplastics and tend to flow at elevated temperatures. Wax compositions have not had any utility, therefore, in the reinforcing laminate field such as fiberglass reinforcing laminates.

It has long been well known in the art to improve the air drying properties of polyester resins by adding a small amount of wax to the uncrosslinked, unsaturated polyester resin, which wax becomes incompatible in the curing resin and exudes to the surface to form a protective film. The resin then cures to a tack-free condition. For example, it has been known to add from 0.01 percent to 0.5 percent paraffin wax to the liquid resin. Since the wax is incompatible with the cured resin, it is displaced to the surface as the film proceeds to cure from the bottom outward. The wax also tends to come to the surface because it has a lower specific gravity than the resin. It has been found that a very small amount of wax is sufficient to give an extremely thin film which is sufficient to keep the surface of the resin out of contact with air so that its polymerization is not inhibited and it cures to a tack-free condition. This phenomenon is described at page 178 of the above-mentioned book by Lawrence.

A novel composition now has been found comprising a petroleum wax, a polyester resin and a crosslinking agent which is useful as a coating material and reinforcing laminate because of its thermosetting properties. This wax composition has the properties of a thermosetting polyester resin, i.e., it imparts strength and rigidity and is temperature resistant. Consequently, it may be utilized as a reinforcing laminant and coating material for the multitude of uses heretofore reserved for the polyester resins and similar thermosetting materials.

It is, therefore, an object of this invention to provide thermosetting wax compositions.

It is another object of this invention to provide compositions containing substantial amounts of a petroleum wax useful as a reinforcing laminant.

It is another object of this invention to provide a thermosetting wax composition containing polyester resins and crosslinking agents.

Other objects of the invention will become apparent from the following description and the claims.

In accordance with the invention, it has been found that certain polyester resins are compatible with petroleum waxes, not only in the liquid state but also after they have been cured in the presence of a crosslinking agent. Each of the components of the composition and the quantities of such components in the composition are set forth in detail hereinafter.

The petroleum wax component of the composition of this invention is used in amounts ranging from 10 to 90 weight percent, preferably from 30 to 50 weight percent. It may be a paraffin wax, a microcrystalline wax, or a mixture of paraffin and microcrystalline waxes.

Paraffin waxes are crystalline petroleum products which are removed from distillates or overhead stocks by sweating or solvent separation. These waxes ordinarily have a melting point in the general range of 115° F. to 200° F. Paraffin waxes are generally considered to have a plate-like crystalline structure. They are relatively hard, brittle and fairly easily fractured. Paraffin waxes are generally obtained from the wax-containing oil distillate fraction and are separated by oil-removal methods, such as chilling and subsequent refining operations (e.g. sweating).

Microcrystalline waxes are well known to those in the petroleum art and such products have also been designated as amorphous or petrolatum waxes. They are derived from less volatile and heavier petroleum fractions than are paraffin waxes. The melting point range of microcrystalline waxes is from about 140° F. to 200° F. The available commercial grades vary in hardness and melting point. They are non-crystalline and non-brittle compared to paraffin waxes.

Crosslinking agents are used in this invention in an amount ranging from 5 to 45 percent by weight, preferably from 25 to 35 percent by weight. As used in this specification, "crosslinking agent" means vinyl-type monomers, i.e. monomers having a vinyl grouping as part of their structure. Examples of crosslinking agents which may be used are styrene, methyl methacrylate, vinyl acetate, 2-ethylhexylacrylate, and n-decyl-methacrylate.

The curing or crosslinking step is carried out at a temperature preferably in the range of from 80° C. to 100° C. in the presence of a peroxide catalyst such as benzoyl peroxide in an amount ranging from preferably about 0.01 percent to 1 percent by weight based on the weight of the total composition.

Only the unsaturated polyester resins are suitable for use in this invention. They are used in amounts ranging from 5 to 45 weight percent and preferably from 25 to 35 weight percent. They are prepared by esterifying a dicarboxylic acid or anhydride of a dicarboxylic acid, or mixtures of either or both with a dihydroxy alcohol in equimolar ratios at a temperature of about 175° C. under an atmosphere of nitrogen for about 2½ hours.

The dihydroxy alcohols used in preparing these polyester-type resins have the following general formula:

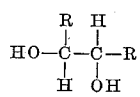

wherein R is either hydrogen or an alkyl radical containing from 10 to 36 carbon atoms. It is necessary in this invention that at least one of the R's be an alkyl radical of from 10 to 36 carbon atoms. In addition, the alkyl radical must contain a straight chain of at least 8 carbon atoms. Examples of suitable dihydroxy alcohols are 1,2 - dihydroxy dodecane, 1,2 - dihydroxy hexadecane, and 1,2-dihydroxy tetracosane. Mixtures of such 1,2-dihydroxy $C_{12}$ to $C_{38}$ alcohols also may be used. These may be prepared from petroleum waxes preferably by thermally cracking a paraffin wax to produce a mixture of alpha-olefins. The alpha-olefins are fractionated to give the desired carbon chain length compounds and thereafter are conveniently converted to the dihydroxy alcohols by expoxidation followed by hydrolysis.

If a single dicarboxylic acid or anhydride of a dicarboxylic acid is used to prepare the polyester-type resins used in this invention, it must be unsaturated. If a mixture of two or more dicarboxylic acids or anhydrides, or a mixture of a dicarboxylic acid and an anhydride of a different dicarboxylic acid, is used in the preparation of the polyester-type resins, at least 50 mole percent of the mixture must be unsaturated. Examples of suitable dicarboxylic acids and anhydrides of dicarboxylic acids which may be used are maleic anhydride, fumaric acid, itaconic acid, adipic acid, phthalic anhydride and the isomeric phthalic acids.

The polyester-type resins used in this invention have the following general formula:

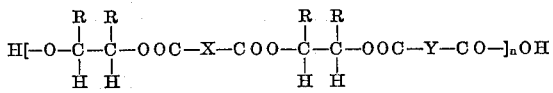

wherein R is either hydrogen or an alkyl radical containing from 10 to 36 carbon atoms and $n$ is an integer ranging from 1 to 15. At least two of the R's, however, which are not connected to adjacent carbon atoms must contain 10 to 36 carbon atoms, at least 8 of which are in a straight chain. In the above general formula X and Y are hydrocarbon radicals selected from the group consisting of alkyl, aryl and alkenyl radicals. Either X of Y must be an alkenyl radical, however, both X and Y may be alkenyl radicals.

The following examples are provided to illustrate various embodiments of the invention.

*Example I*

A polyester was prepared by heating a mixture of 9.8 grams (0.1 mole) of maleic anhydride and 17.4 grams (0.1 mole) of 1,2-dihydroxy decane at a temperature of 175° C. under an atmosphere of nitrogen for 2½ hours. The product was allowed to cool to room temperature.

*Example II*

Equal parts by weight of the polyester product of Example I, of a paraffin wax having a melting point of 150° F. to 155° F. and of styrene were heated at 80° C. until these components became blended. To this mixture was added approximately 0.1 weight percent based on the weight of the composition of benzoyl peroxide as a catalyst and the entire mixture was placed in an oven, where it was held at about 80° C. for about 24 hours. Upon removal from the oven, a two-phase non-homogeneous product was recovered. The wax phase floated on top of the solid polyester resin.

*Example III*

A polyester was prepared in accordance with Example I except that 19.2 grams (0.1 mole) of 1,2-dihydroxy dodecane were used instead of 1,2-dihydroxy decane.

*Example IV*

Equal parts by weight of the polyester product of Example III, of a paraffin wax having a melting point of 150° F. to 155° F. and of styrene were heated at 80° C. until these components became blended. The mixture was treated in a manner identical with that utilized in treating the mixture of Example II. Upon removal from the oven, there was recovered a hard, rigid, homogeneous, thermoset, resinous material.

*Example V*

A polyester was prepared in accordance with Example I except that 19.2 grams (0.1 mole) of 1,12-dihydroxy dodecane was used instead of 1,2-dihydroxy decane.

*Example VI*

Equal parts by weight of the polyester product of Example V, of a paraffin wax having a melting point of 150° F. to 155° F. and of styrene were heated at 80° C. until these components became blended. The mixture was treated in a manner identical with that utilized in treating the mixture of Example II. Upon removal from the oven, the wax phase floated on top of the solid polyester resin.

From the products recovered in Examples II, IV and VI, it is apparent that in order to produce the desired homogeneous, thermoset, resinous materials of this invention, it is necessary not only that the dihydroxy alcohol used to prepare the polyester have a 1,2-dihydroxy structure, but that the alcohol also have attached to the adjacent carbon atoms having a hydroxyl radical substituted thereon, an alkyl radical having at least 10 carbon atoms, eight of which are in a straight chain.

*Example VII*

A polyester was prepared by heating a mixture of 20.2 grams (0.1 mole) of sebacic acid and 19.2 grams (0.1 mole) of 1,2-dihydroxy dodecane at a temperature of 175° C. under an atmosphere of nitrogen for 2½ hours. The product was allowed to cool to room temperature.

*Example VIII*

Equal parts by weight of the polyester product of Example VII, of a paraffin wax having a melting point of 150° F. to 155° F. and of styrene were heated at 80° C. until these components became blended. The mixture was treated in a manner identical with that utilized in treating the mixture of Example II. Upon removal from the oven, a two-phase, non-homogeneous product was recovered. The wax phase floated on top of the solid polyester resin.

*Example IX*

A polyester was prepared by heating a mixture of 15.1 grams (0.075 mole) of sebacic acid, 2.5 grams (0.025 mole) of maleic anhydride and 19.2 grams (0.1 mole) of 1,2-dihydroxy dodecane at a temperature of 175° C. under an atmosphere of nitrogen for 2½ hours. The product was allowed to cool to room temperature.

*Example X*

Equal parts by weight of the polyester product of Example IX, of a paraffin wax having a melting point of 150° F. to 155° F. and of styrene were heated at 80° C. until these components became blended. The mixture was treated in a manner identical with that utilized in treating the mixture of Example II. Upon removal from the oven, a homogeneous product was recovered. Although this product was homogeneous, the resinous material had no thermosetting properties and the wax component contained therein tended to bleed to the surface of the resinous material in a manner similar to prior art polyester-wax compositions.

*Example XI*

A polyester was prepared by heating a mixture of 10.1 grams (0.05 mole) of sebacic acid, 4.9 grams (0.05 mole) of maleic anhydride and 19.2 grams (0.1 mole) of 1,2-dihydroxy dodecane at a temperature of 175° C. under an atmosphere of nitrogen for 2½ hours. The product was removed from the heat and allowed to cool to room temperature.

*Example XII*

Equal parts by weight of the polyester product of Example XI, of a paraffin wax having a melting point of 150° F. to 155° F. and of styrene were heated at 80° C. until these components became blended. The mixture was treated in a manner identical with that utilized in treating the mixture of Example II. Upon removal from the oven, there was recovered a hard, rigid, homogeneous thermoset, resinous material.

*Example XIII*

A polyester was prepared by heating a mixture of 5.0 grams (0.025 mole) of sebacic acid, 6.4 grams (0.075 mole) of maleic anhydride and 19.2 grams (0.1 mole) of 1,2-dihydroxy dodecane at a temperature of 175° C. under an atmosphere of nitrogen for 2½ hours. The product was allowed to cool to room temperature.

*Example XIV*

Equal parts by weight of the polyester product of Example XIII, of a paraffin wax having a melting point of 150° F. to 155° F. and of styrene were heated at 80° C. until these components became blended. The mixture was treated in a manner identical with that utilized in treating the mixture of Example II. Upon removal from the oven, a hard, rigid, homogeneous, thermoset, resinous material was recovered.

From the products recovered in Examples VIII, X, XII and XIV, it is apparent that mixtures of different carboxylic acids may be used to prepare the resinous products of the instant invention and, in addition, in order to obtain the desired products, the mixture must be at least 50 mole percent unsaturated.

*Example XV*

A polyester was prepared by heating a mixture of 29.4 grams (0.3 mole) of maleic anhydride and 57.6 grams (0.3 mole) of 1,2-dihydroxy dodecane at a temperature of 175° C. under an atmosphere of nitrogen for 2½ hours. The product was removed from the heat, divided into three equal portions and allowed to cool to room temperature.

*Example XVI*

Equal parts by weight of the first portion of the polyester product of Example XV, of a paraffin wax having a melting point of 150° F. to 155° F. and of methyl methacrylate were heated at 80° C. until these components were blended. The mixture was treated in a manner identical with that utilized in treating the mixture of Example II. Upon removal from the oven, there was recovered a hard, rigid, homogeneous, thermoset, resinous material.

*Example XVII*

Equal parts by weight of the second portion of the polyester product of Example XV, of a paraffin wax having a melting point of 150° F. to 155° F. and of vinyl acetate were heated at 80° C. until these component were blended. The mixture was treated in a manner identical with that utilized in treating the mixture of Example II. Upon removal from the oven, there was recovered a hard, rigid, homogeneous, thermoset, resinous material.

*Example XVIII*

Equal parts by weight of the third portion of the polyester product of Example XV, of a paraffin wax having a melting point of 150° F. to 155° F. and of 2-ethylhexyl acrylate were heated at 80° C. until these components were blended. The mixture was treated in a manner identical with that utilized in treating the mixture of Example II. Upon removal from the oven, there was recovered a spongy, rubbery, homogeneous, thermoset, resinous material.

*Example XIX*

A polyester was prepared by heating a mixture of 0.1 mole of 1,2-dihydroxy dodecane, 0.05 mole of maleic anhydride and 0.05 mole of phthalic anhydride at 175° C. for two hours under an atmosphere of nitrogen. The product was removed from the heat, allowed to cool to room temperature, and divided into two portions.

*Example XX*

Equal parts by weight of one portion of the polyester product of Example XIX, of a paraffin wax having a melting point of 150° F. to 155° F. and of styrene, together with 0.5 percent by weight based on the total weight of the composition of benzoyl peroxide catalyst were blended and the composition cured for eight hours at 100° C. The cured composition was a tough, hard, homogeneous, thermoset, resinous material.

*Example XXI*

Equal parts by weight of the second portion of the polyester product of Example XIX, of a paraffin wax having a melting point of from about 150° F. to 155° F. and of n-decyl methacrylate together with 0.5 percent by weight based on the total weight of the composition of benzoyl peroxide catalyst were blended and the composition cured for eight hours at 100° C. The cured composition was a tough, rubbery, homogeneous, thermoset, resinous material.

*Example XXII*

A polyester was prepared by heating a mixture of 0.1 mole of 1,2-dihydroxy dodecane, 0.025 mole of phthalic anhydride, 0.05 mole of maleic anhydride and 0.025 mole of sebacic acid at 175° C. for two hours under an atmosphere of nitrogen. The product was removed from the heat and allowed to cool to room temperature.

*Example XXIII*

Equal parts by weight of the polyester product of Example XXII, of a paraffin wax having a melting point of 150° F. to 155° F. and of n-decyl methacrylate, together with about 0.5 percent by weight based on the total weight of the composition of benzoyl peroxide catalyst were blended and cured for eight hours at 100° C. The cured composition was a tough, rubbery, homogeneous, thermoset, resinous material.

From the products recovered in Examples XVI, XVII, XVIII, XX, XXI and XXIII, it is apparent that the thermoset materials prepared according to this invention may range from soft, spongy, rubbery materials to hard, rigid materials depending upon the crosslinking agent employed.

I claim:

1. A homogeneous, thermoset, resinous composition comprising from 10 to 90 weight percent petroleum wax having a melting point ranging from 115° F. to 200° F., from 5 to 45 weight percent polyester resin having the general formula

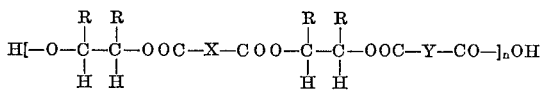

wherein R is selected from the group consisting of hydrogen and an alkyl radical containing from 10 to 36 carbon atoms, at least two of the R's which are not connected to adjacent carbon atoms must contain from 10 to 36 carbon atoms, at least 8 of which are in a straight chain, X and Y are hydrocarbon radicals selected from the group consisting of alkyl, aryl, and alkenyl radicals, at least one of the radicals X and Y is an alkenyl radical, and $n$ is an integer ranging from 1 to 15, and from 5 to 45 weight percent crosslinking agent selected from the group consisting of styrene, methyl methacrylate, vinyl acetate, 2-ethylhexyl acrylate, and n-decyl methacrylate.

2. The composition of claim 1 wherein the petroleum wax is a paraffin wax.

3. The composition of claim 1 wherein the petroleum wax is a microcrystalline wax.

4. The composition of claim 1 wherein the petroleum wax is a mixture of paraffin wax and microcrystalline wax.

5. The composition of claim 1 wherein the petroleum wax is present in an amount ranging from 30 to 50 weight percent.

6. The composition of claim 1 wherein the polyester is present in an amount ranging from 25 to 35 weight percent.

7. The composition of claim 1 wherein the crosslinking agent is present in an amount ranging from 25 to 35 weight percent.

References Cited by the Examiner
UNITED STATES PATENTS

| | | | |
|---|---|---|---|
| 2,931,837 | 4/1960 | Stansbury et al. | 260—75 |
| 2,971,989 | 2/1961 | Lapporte et al. | 260—635 |

FOREIGN PATENTS

| | | |
|---|---|---|
| 533,413 | 9/1954 | Canada. |

ALEXANDER H. BRODMERKEL, *Primary Examiner.*

MORRIS LIEBMAN, *Examiner.*

D. C. KOLASCH, J. A. GAZEWOOD,
*Assistant Examiners.*